Feb. 23, 1965   B. BLUMBERG, JR   3,170,846
STEAM GENERATOR
Filed May 6, 1963
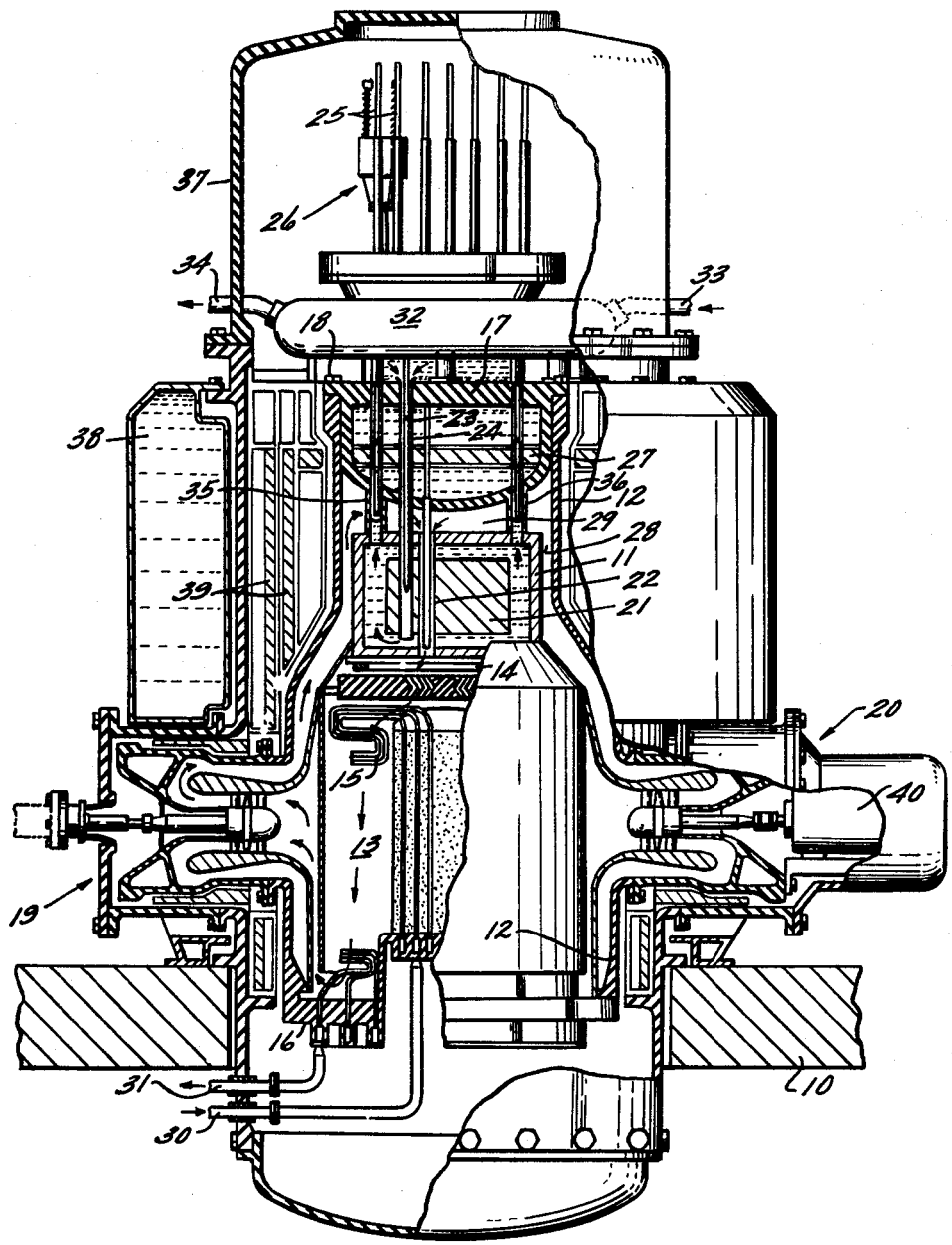
INVENTOR.
BEN BLUMBERG, JR.
BY
John F. Cullen
ATTORNEY

United States Patent Office 3,170,846
Patented Feb. 23, 1965

3,170,846
STEAM GENERATOR
Ben Blumberg, Jr., Wyoming, Ohio, assignor, by mesne assignments, to the United States of America as represented by the United States Atomic Energy Commission
Filed May 6, 1963, Ser. No. 278,257
15 Claims. (Cl. 176—59)

The present invention relates to a nuclear steam generator and, more particularly, to such a steam generator employing a gas cooled reactor which is capable of producing superheated steam in a compact overall and lightweight power package.

In the field discussed herein, there are generally two types of systems which are presently available. These are respectively, the pressurized water system and the boiling water system. For these systems, there is available the water cooled reactor. Additionally, liquid metal and organic reactors could be used in an arrangement similar to the one proposed for the gas cooled reactor of the present invention but so many problems are presented with use of these reactors that they are of little interest.

The pressurized water reactor system produces saturated steam or only slightly superheated steam which is insufficient for high cycle efficiency and small lightweight steam system components. In such system, water is circulated through the reactor and through a heat exchanger in a primary loop. The reactor gives up heat to the water and the feed water for the boiler is passed through the other side of the heat exchanger to extract the heat from the primary loop. In other words, heat is exchanged from one water loop to another water loop. In the secondary loop, of course, a turbine and condenser will be supplied. A primary difficulty of the system is that in the primary loop the maximum temperature that may be obtained is 705° F. This is due to the physical property of water since it will not remain a liquid at any temperature above this range and turns to steam and the reactor employed with such a system will not operate with steam because it needs liquid water to act as a moderator or the reactor cannot be made critical. Consequently, the pressurized water reactor system is insufficient to produce superheated steam.

The other system is a boiling water reactor system, and this system eliminates the secondary water loop. The system consists of a reactor partially filled with water and having fuel pins in it. It produces steam inside the reactor which steam is passed through a loop and through the turbine and a condenser to be returned to the interior of the reactor for boiling again. This system, as presently known, will not produce an appreciable steam superheat because the power in the superheat portion of the reactor would be too low. Thus, with this type of reactor, there is a limit to the quality of superheat that can be achieved. An improvement for this system is to use a secondary moderator loop and fuel elements designed for steam cooling. This, in effect, employs two reactors in one system which is not feasible from an economical viewpoint.

Thus, neither the pressurized water reactor system nor the boiling water reactor system produces the superheated steam that is desired for best operation.

A further system, the liquid metal system, employs liquid metal through the reactor to be heated in a primary loop and a secondary loop containing the turbine and condenser is provided in the manner of the pressure water reactor system. The liquid metal can operate at high termperatures and can produce superheated steam in the secondary loop. The disadvantages with the liquid metal system is the difficulty of working with it. Any leaks create a fire hazard, it is generally quite toxic, and it is necessary to have a supply of the liquid metal available at all times inasmuch as it is a specialized coolant. Further, if the system is shut down. The liquid metal solidifies and it is necessary to have a heater to re-melt it when the system is started up. Additionally, if a break occurs in the system, the liquid metal is lost and damage occurs because such systems employ fuel elements in the reactors that are designed for cooling by the liquid metal and the air available after the loss of the metal is insufficient to prevent melting even if the reactor is scrammed.

A further system known as the organic is similar to the liquid metal but it has so many complex problems that it is no longer even considered as feasible within the state of knowledge of the art.

Another system is a gas cooled or air cooled reactor system and this is the type of the instant invention. This system obviously has available a sufficient amount of gas—the complete outdoors—which is available at all times. It has many advantages as will be apparent in the instant invention.

The main object of the present invention is to provide a nuclear steam generator using a gas cooled reactor which provides any reasonable quantity and quality of superheated steam in a relatively small heat exchanger, small reactor system.

Another object is to provide such a steam generator in which the novel arrangement of parts perform dual functions in the overall combination.

A further object is to provide such a generator which permits the use of high enrichment fuel with a consequent smaller reactor, smaller heat exchanger, and thereby lower capital investment in the overall equipment.

Another object is to provide such a nuclear steam generator which permits of easy refueling of the reactor and low down time of the system.

It is also an object of the invention to provide a closed cycle gas system and containment means to reduce hazards in the event of accidents.

Briefly stated, the invention discloses a nuclear steam generator having a gas cooled reactor with a boiler separated from the reactor by a plenum chamber. An open-ended pressure vessel surrounds the reactor and boiler and is spaced from them and has a shield plug closing one end of the vessel with means connected to the shield plug for supporting the reactor directly therefrom. The other end of the pressure vessel is closed by separate means, such as the boiler tube sheet. Pump means is provided for circulating gas within the pressure vessel in a closed cycle through the reactor, boiler, pump and back to the reactor. The gas is heated in the reactor and is cooled in the boiler. Boiler feed water is directed through the boiler in heat exchange relation with the heated gas. Control means is provided primarily outside the pressure vessel and is connected to the reactor through the shield plug for control of the reactor.

While the specification concludes with claims particularly pointing out and distinctly claiming the subject matter which is regarded as the invention, it is believed the invention will be better understood from the following description taken in connection with the accompanying drawing in which:

The drawing illustrates a cross-sectional view, partially in section, of the instant invention and illustrating the arrangement of parts therein.

Referring to the drawing, there is shown an overall arrangement of the combination of parts forming the nuclear steam generator of the instant invention. It is to be noted that the invention is shown herein as it might be supplied as a steam generator for shipboard propulsion purposes. As such, it would be intended to replace the heavy and large boilers, fuel conveyors, and fuel storage means. To this end, the deck of a ship is shown at 10 although it may be any suitable mounting surface whether aboard ship or not. In order to provide the necessary heat for the generation of steam, a gas cooled nuclear reactor 11 is provided in the overall assembly. The reactor is disposed within a pressure vessel 12 that may be upright in the general shape of a cylinder open at its ends. The heat generated by reactor 11 is utilized in a boiler generally indicated at 13 and conveniently disposed closely adjacent the reactor and preferably, for shielding, directly below thereof. This minimizes ductwork and, for practical purposes, substantially eliminates it since it requires only a plenum chamber 14 between the reactor and boiler. The boiler may be of serpentine or spiral tubes as indicated at 15 for the passage of water therethrough for generation of steam. The pressure vessel 12 is closed at its lower end preferably by a tube sheet member 16 which, in conjunction with the boiler 13, thus serves the dual purpose of a tube sheet for distribution of water to the boiler and steam out of the boiler and a closure for the pressure vessel 12. It may be attached by any suitable means, not shown, to complete the lower end of the pressure vessel. In order to close the upper end of the open-ended cylindrical type vessel 12, there is provided a shield plug 17 which is bolted by means 18 to the pressure vessel. The shield plug 17 serves a fourfold purpose of water distribution for the reactor, a reactor support, support of the control actuating means, and the top closure of the pressure vessel 12. In order to move the gas or air that is contained within the pressure vessel 12, there is provided a main pump means generally indicated at 19 and an auxiliary pump means at 20. These are preferably located as shown at each side of the boiler and are selectively usable. The main pump 19 is used to circulate air, in a closed cycle, within pressure vessel 12 and the auxiliary pump means 20 is used for starting and in the event of a breakdown of main pump 19. The main pump may be electrical or steam driven and the auxiliary pump is electrically driven.

As thus far described, the combination of components consist of reactor 11, boiler 13 and pump means 19 all contained within the closed pressure vessel 12. As is apparent, this is a very compact arrangement of one component above the other.

The internal structure and operation of these enclosed components will now be described. In order to generate the heat required for operation of the system, reactor 11 may be a water containing vessel as shown having a core 21 with tubes 22, each of which contain a fuel cartridge, passing therethrough, only one of which is shown in the drawing. These tubes are intended to conduct air through the reactor. In order to control the reactor, suitable control rods 23 are provided to extend through guide tubes 24. These tubes extend through the shield plug and the control rods thereby extend into the reactor for control of the reactor. These rods, along with suitable scram means 25, are operable by an actuating control means generally indicated at 26 and located above the shield plug as shown. The actuating means merely provides for operation of the reactor and suitable emergency means as is well known. For proper shielding, the shield plug 17 is compartmented to form water tanks separated by a shield slab 27 as shown. To provide for the complete recycling of the air or gas within pressure vessel 12, the reactor and boiler are spaced from vessel 12 to provide an annulus 28 therebetween for the upward flow of air.

As thus far described, the operation includes self-contained air or gas which is forced upwardly by pump 19 through annulus 28 into a collecting plenum 29 and then down through tubes 22 where the air is heated to a very high temperature. The air continues through plenum 14 and across tubes 15 to heat the water therein to produce the quantity and quality needed of superheated steam. The then cooled air continues around the lower part of the boiler 13 above the tube sheet 16 and back into pump 19 to be recirculated again within the closed system.

In order to generate the steam, the boiler feed water is brought into boiler 13 by a suitable line 30 and passed through the boiler to emerge as steam in line 31. This is removed to a point of use such as a turbine for driving a load including ship propellers. In order to make efficient use of the heat available in the reactor's moderator water, a suitable heat exchanger 32 may be employed to preheat the boiler feed water and the feed water then enters heat exchanger 32 at line 33 and exits at line 34 after being preheated. Line 34 may be connected to inlet line 30 for entrance of the preheated feed water into the boiler. To provide additional protection and shielding the heat exchanger 32 may be conveniently disposed above shield plug 17 as shown.

The preheating is accomplished by passing water from the reactor through the heat exchanger for heat exchange relation with the feed water. The reactor and control rod cooling is obtained by passing water through guide tubes 24, thus through the shield plug 17 to the interior of the reactor. The water is then removed through pipes 35 and 36 and goes back to the heat exchanger. Thus, the heat obtained in cooling is effectively used for preheating the feed water in the heat exchanger 32.

While air has been described as the circulating fluid in the closed cycle within pressure vessel 12, the system is not limited to the use of air. Other gases such as helium and hydrogen and superheated steam may be used to increase the power capability. It should be apparent that the power capability of the system may be increased manyfold by the use of superheated steam in place of air. In other words, steam is recirculated within the closed system and because of the higher heat transfer coefficient of steam it is possible to pump more secondary fluid—steam—through the boiler. With the increase in rate of flow steam through the boiler the output is increased in the same size boiler and the rate of steam generation of the boiler may be doubled.

From the structure thus far described, it can be seen that the reactor 11 is supported or suspended directly from shield plug 17 by means of the water directing means or pipes 35 and 36 as well as the control structure guide tubes 24. With this support the reactor can be removed merely by lifting the shield plug 17 out of the system and substituting it with a new shield plug and reactor thus cutting the down time of the system considerably. Then the reactor may be refueled at another place and used in a new system at some future date. The down time for refueling, in this structural arrangement, is cut to a bare minimum requiring only the removal and replacement of the plug and reactor.

In order to provide extra safety and containment in the event of any ruptures in the system, the pressure vessel is further enclosed in a containment member 37 extending substantially completely about the pressure vessel as well as the heat exchanger 32 and actuating means 26. This containment member extends below the boiler as shown. This forms a back-up or barrier to release of gas from the pressure vessel 12. The area of actuating means 26, may be filled with air to provide an expansion volume in the event of rupture of the pressure vessel.

Thus, the air within the pressure vessel may expand into the containment vessel and reduce its pressure and contain it from going into the surrounding atmosphere. The containment vessel may include shielding 38 which may be water tanks in addition to concentric lead shields 39 mounted within the containment member but outside the pressure vessel.

With the structure described and the containment of the essential elements within pressure vessel 12 and the consequent pressurization of the closed cycle, it will be apparent that the air is a better heat transfer medium. This permits a smaller reactor with less heat transfer area and a smaller boiler because of the higher heat transfer coefficient under the pressurized conditions. The result is a compact unit that is much smaller than any heretofore believed possible and enables the efficient production of desired quantities of superheated steam. Further, with the arrangement of the plug over the reactor over the boiler and separated only by plenum chambers, ducting is virtually eliminated and the problems normally associated with shielding and rupture of ducting are therefore also eliminated. The support of the reactor direct from the plug permits easy refueling and a very short down time.

The auxiliary pump means 20 is selectively used in starting the assembly and is operated by an electric motor 40 to start the air circulating. As the air circulates and passes over the water tubes, it starts producing steam which then may be bled off to operate a steam turbine, not shown, for operation of the primary pump 19. Additionally, in the event of breakdown of the primary pump, the auxiliary pump 20 is designed to keep the fuel elements within the reactor down to a reasonable temperature by circulating the air.

While there has been described a preferred form of the invention, obvious modifications and variations are possible in light of the above teachings. It is therefore to be understood that within the scope of the appended claims, the invention may be practiced otherwise than as specifically described.

I claim:

1. A nuclear steam generator comprising,
   a gas cooled reactor,
   a boiler separated from said reactor by a plenum chamber, said boiler being exposed to radiation from said reactor,
   an open-ended pressure vessel surrounding said reactor and boiler and spaced therefrom,
   a shield plug closing one end of said vessel,
   means connecting said shield plug to said reactor for support thereof,
   means spaced from said boiler closing the other end of said vessel,
   pump means for circulating gas within said pressure vessel in a closed cycle through said reactor, boiler, pump, and reactor whereby the gas is heated in said reactor and cooled in the boiler,
   means directing water through said boiler in heat exchange with the gas therein,
   and control means outside the pressure vessel connected to the reactor through said shield plug for control of the reactor.

2. Apparatus as described in claim 1 wherein the boiler is disposed below the reactor in said pressure vessel to form a shield for said reactor.

3. Apparatus as described in claim 1 wherein said pressure vessel is substantially cylindrical with said shield plug disposed above the reactor to support said reactor in dependent relation therefrom and,
   said boiler is disposed below the reactor in close-coupled relation thereto, to minimize ducting and shield each end of the pressure vessel.

4. Apparatus as described in claim 1 wherein the means connecting said shield plug to the reactor includes the control means.

5. A nuclear steam generator comprising,
   a gas cooled reactor,
   a boiler separate from and disposed adjacent and below said reactor, said boiler being subjected to radiation from said reactor,
   a generally upright cylindrical pressure vessel surrounding said reactor and boiler and spaced therefrom to form an annulus therearound,
   a shield plug closing the upper end of said vessel,
   means connecting said shield plug and reactor for the dependent support of the reactor from said shield plug,
   means closing the other end of said vessel below said boiler,
   pump means for circulating gas in said pressure vessel in a closed cycle down through said reactor and boiler and thence up said annulus and down through the reactor whereby the gas is heated in said reactor and cooled in the boiler,
   tube means directing feed water through said boiler in heat exchange relation with said gas for conversion to steam, and
   control means outside the pressure vessel at said shield plug end and connected through said plug to the reactor for control of reactor.

6. Apparatus as described in claim 5 wherein said control means includes control rods and guide tubes through said shield plug and means for actuating said rods.

7. Apparatus as described in claim 6 having a heat exchanger disposed above said shield plug and pipe-connected to said reactor through said plug to provide water circulation through the reactor for cooling the control rods therein,
   said heat exchanger using said water for preheating said feed water.

8. Apparatus as described in claim 7 wherein the means connecting said reactor and shield plug is composed of said pipe and control means connections to said reactor.

9. Apparatus as described in claim 8 wherein the shield plug is compartmented to form water tanks separated by a shield slab for securement to said vessel.

10. Apparatus as described in claim 8 having a containment member including shielding spaced from and around said pressure vessel, heat exchanger, control and actuation means.

11. A nuclear steam generator comprising,
    an air cooled water containing reactor having tubes extending therethrough for the passage of air,
    a boiler separate from and disposed adjacent and below said reactor,
    dual pump means on each side of said boiler and selectively usable,
    an upright generally cylindrical pressure vessel surround said boiler and reactor and spaced therefrom to form an annulus therearound,
    said vessel also containing said pump means,
    a shield plug closing the upper end of said vessel and means closing the lower end of said vessel below said boiler and pump means,
    said pump means being selectively actuated to circulate air in said vessel in a closed cycle down through said reactor for heating, into said boiler for cooling by heat exchange, and up through said annulus and again into said reactor,
    a heat exchanger disposed as a shield out of said vessel above said shield plug,
    means directing feed water through said heat exchanger and through said boiler for conversion to steam by said hot air,
    reactor control means disposed above said shield plug and including control rods extending therethrough in guide tubes into said reactor for control thereof,
    means for directing water through said guide tubes and said heat exchanger for preheating said feed water,
    actuating means for said control means, and a containment member including shielding spaced from and around said pressure vessel, heat exchanger, control and actuating means.

12. Apparatus as described in claim 11 wherein said shield means supports said reactor therefrom by said means directing water through said guide tubes.

13. Apparatus as described in claim 11 wherein the shield plug is compartmented to form water tanks separated by a shield slab for securemental to said vessel.

14. Apparatus as described in claim 11 wherein said shielding in said containment member is composed of concentrically arranged lead and water shields.

15. Apparatus as described in claim 14 wherein steam is circulated within said pressure vessel in place of air.

References Cited by the Examiner
UNITED STATES PATENTS

| | | | |
|---|---|---|---|
| 2,946,732 | 7/60 | Wootton | 176—31 |
| 3,069,341 | 12/62 | Daniels | 176—55 |

CARL D. QUARFORTH, *Primary Examiner.*

REUBEN EPSTEIN, *Examiner.*